United States Patent [19]

Cordery et al.

[11] Patent Number: 5,017,907

[45] Date of Patent: May 21, 1991

[54] DOUBLE PULSE MAGNETIC MARKERS

[75] Inventors: Robert A. Cordery, Danbury; William L. Kilmartin, West Haven; Claude Zeller, Monroe, all of Conn.

[73] Assignee: Pitney Bowes Inc., Stamford, Conn.

[21] Appl. No.: 466,123

[22] Filed: Jan. 16, 1990

[51] Int. Cl.⁵ .............................................. G08B 13/24
[52] U.S. Cl. ...................................... 340/551; 340/572
[58] Field of Search ................................ 340/551, 572

[56] References Cited

U.S. PATENT DOCUMENTS

| 4,568,921 | 2/1986 | Pokalsky | 340/551 |
| 4,686,154 | 8/1987 | Mejia | 340/551 |
| 4,710,752 | 12/1987 | Cordery | 340/572 |
| 4,935,724 | 6/1990 | Smith | 340/551 |

Primary Examiner—Glen R. Swann, III
Attorney, Agent, or Firm—Peter Vrahotes; Melvin J. Scolnick; David E. Pitchenik

[57] ABSTRACT

A ferromagnetic marker for an electronic surveillance system is magnetically biased so that the magnetic fields of two different regions thereof extend in different direction, e.g. in opposite directions.

9 Claims, 3 Drawing Sheets

DOUBLE PULSE MAGNETIC MARKERS

BACKGROUND OF THE INVENTION

This invention relates to electronic surveillance systems, and more in particular to an improved marker for use in such systems.

Electronic surveillance systems of the type to which the present invention is directed, are generally employed to detect the presence of a magnetic marker in a magnetic field. Such systems thus include a device for generating a magnetic field, and a receiver for detecting variations in the field resulting from passing of a marker, generally carried by an article, through the field.

Such a system is disclosed, for example, in U.S. Pat. No. 4,710,752, Cordery. In the system disclosed in this reference, the ability of the system to detect the presence of a marker, in the presence of noise, is enhanced by forming the magnetic field of more than one frequency component.

A magnetic marker "switches", to provide a detectable "output", when the externally applied field passe the coercive field of the ferromagnetic marker. At this time, if the marker is biased, then the phase of the externally applied field at which the marker switches is changed.

Soft magnetic markers for electronic surveillance systems are also disclosed, for example, in U.S. Pat. No. 4,686,154, wherein a marker is comprised of two strips of soft magnetic material having different coercivities but equal magnetic saturation levels.

SUMMARY OF THE INVENTION

The present invention is directed the provision of an improved magnetic marker for systems of the above type, wherein the detectable characteristics of the marker are enhanced in a simple and economical manner.

Briefly stated, in accordance with the invention, this objective is achieved by biasing two different regions of the marker with magnetic biases that are directed in two different (e.g. opposite) directions. As a consequence, the different regions of the marker switch at two distinct phases as it passes through a magnetic field, to produce a more readily detectable "double pulse" output.

The invention thus provides a marker for an electronic surveillance system, including a high permeability ferromagnetic material and means for applying a magnetic bias to the ferromagnetic material. The material has first and second regions, and the biasing means comprises means for applying magnetic biases that are directed in first and second different directions in the first and second regions of the ferromagnetic material.

The invention is also directed to an electronic surveillance system including a magnetic field generator, a magnetic field detector and a marker adapted to pass in the field of the generator to influence the signals detected by the detector. The marker comprises a high permeability ferromagnetic material and means for applying a magnetic bias to the ferromagnetic material. The material has first and second regions, and the biasing means comprises means for applying magnetic biases that are directed in first and second different directions in the first and second regions of the ferromagnetic material.

BRIEF DESCRIPTION OF THE DRAWING

In order that the invention may be more clearly understood, it will now be disclosed in greater detail with reference to the accompanying drawing, wherein.

DETAILED DISCLOSURE OF THE INVENTION

Figure 1:
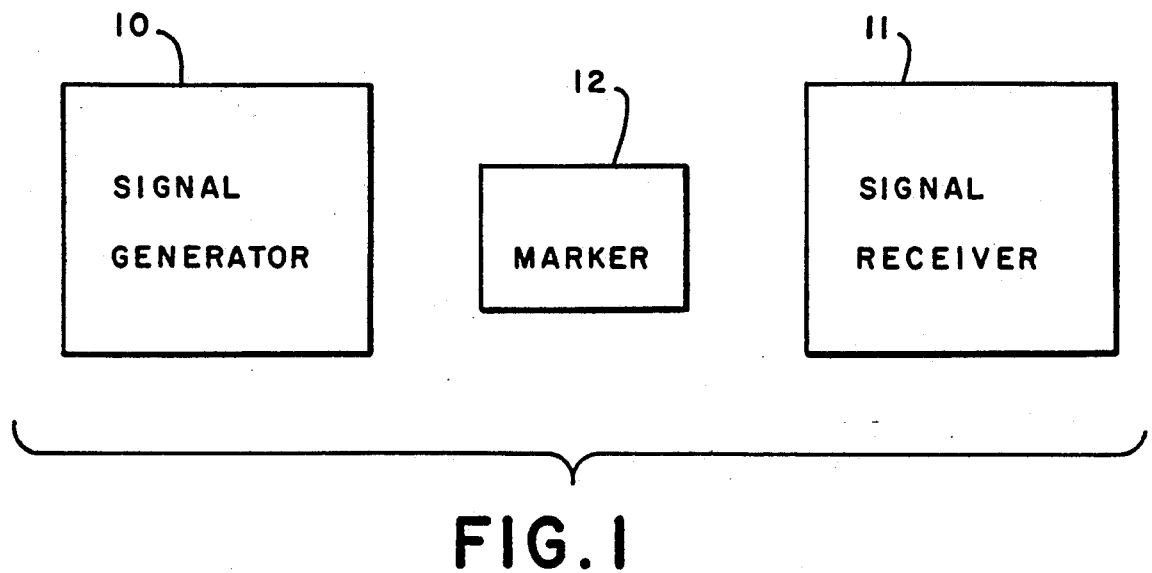
FIG. 1 is a block diagram of an electronic surveillance system of a type in which the marker of the invention may employed.

FIG. 1 is a simplified block diagram of an electronic surveillance system of the type that may employ the magnetic marker of the invention. In this system, a gate including a signal generator 10 and a signal receiver 11 are spaced apart a distance such that a magnetic marker 12 may pass therebetween and influence the magnetic field therein. The gate 10, 11 may be comprised, for example, of a loop antenna coupled to a source of alternating energy and optionally shielded in order to remove the electrostatic field. While the frequency and amplitude of the energy in the magnetic field is not of concern with respect to the present invention, as an example it may be 1-20 kHz, and in regions of the gate have an amplitude 2-20 Oe.

The gate 10, 11 also includes a signal receiver which may be comprised of a shielded loop antenna connected to, for example, a detector tuned to one or several harmonic frequencies of the transmitter.

The marker 12, as will be discussed, is formed of a ferromagnetic material, and may be incorporated in or affixed to an article whose passage through the magnetic field is to be detected.

Figure 2:
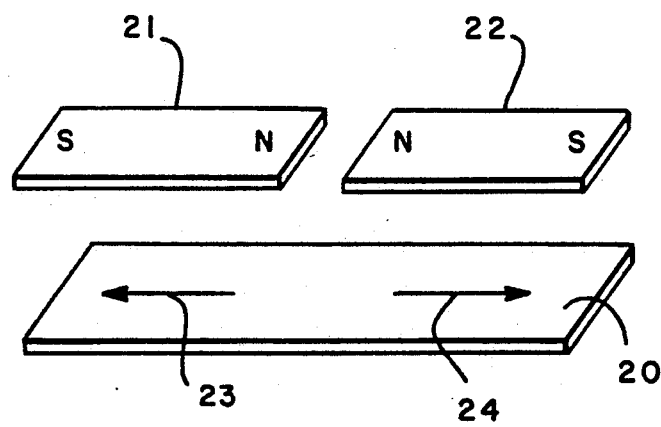
FIG. 2 is a simplified perspective view of a marker in accordance with one embodiment of the invention.

In accordance with the invention, as illustrated in FIG. 2, a marker may be comprised of a strip 20 of a high permeability ferromagnetic material. First and second magnets 21,22 are mounted by any suitable conventional means adjacent different regions of the strip 20. For example, as illustrated, the magnets may be positioned to extend parallel to the strip 20 and be longitudinally spaced apart, so that the magnet 21 primarily magnetically influences one end of the strip, as indicated by the arrow 23, and the magnet 22 primarily influences the other end of the strip, as indicated by the arrow 24. In this instance it is apparent that the two ends of the strip are magnetically biased in opposite directions. While it is preferred that the biasing fields in the strip 20 be opposite, it is apparent that they may alternatively extend in other different relative directions.

The magnets 21,22 may also be strip-shaped, as illustrated, and may be permanent magnets comprised of a high magnetic coercivity material. It is also within the contemplation of the invention that the magnets 21,22 may be adapted to have their magnetic fields canceled, for example by passage through a high intensity magnetic field, to thereby intentionally enable the passage of the marker undetected through the field of the transmitter 10.

Figure 3A:
FIGS. 3a-3d are time curves illustrating the operation of the invention.
Figure 3B:
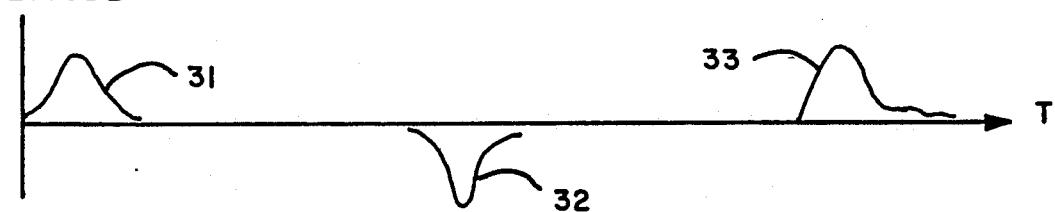
Figure 3C:
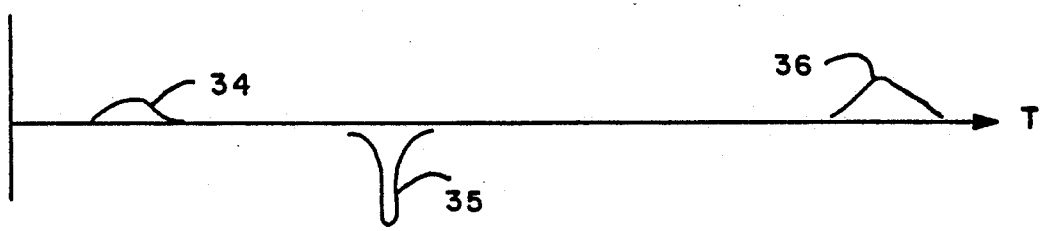
Figure 3D:
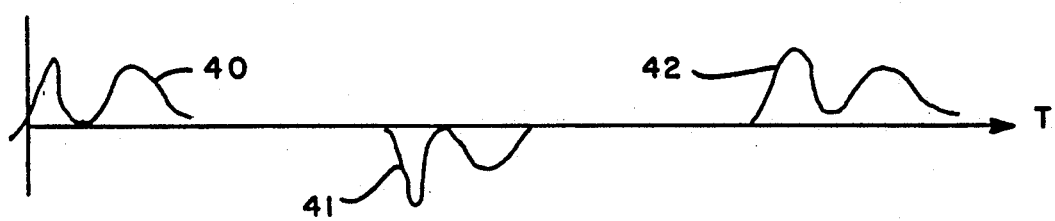

Curve 30 of FIG. 3a illustrates the alternating field strength of a magnetic field that may be employed in an electronic surveillance system, for example as illustrated in FIG. 1. When an unbiased ferromagnetic marker is present in such a field, it outputs single pulses 31-33 of alternating polarity near the zero crossovers of the magnetic field, as illustrated in FIG. 3b. If the ferromagnetic markers are biased in a single direction, the resultant pulses 34-36 are still single pulses, but they are shifted in phase, as illustrated in FIG. 3c. These single pulses may be difficult to discern, however, in the presence of noise, so that either the strength of the magnetic field must be increased, or the spacing between the sides of the gate must be reduced to be as small as possible. These pulses are difficult to discern from magnetic pulses from other magnetic materials such as nickel-iron plating or other magnetic EAS tags.

In accordance with the present invention, however when the marker is provided with two different biases, it emits double pulse outputs 40-42 as illustrated in FIG. 3c. These pulses, which are produced as a result of the fact that the two biasing fields, in two different regions of the marker, "switch" at two different intensities of the external magnetic field, are much more easily detected and discriminated from noise signals and false alarm sources by the signal receiver.

Figure 4:
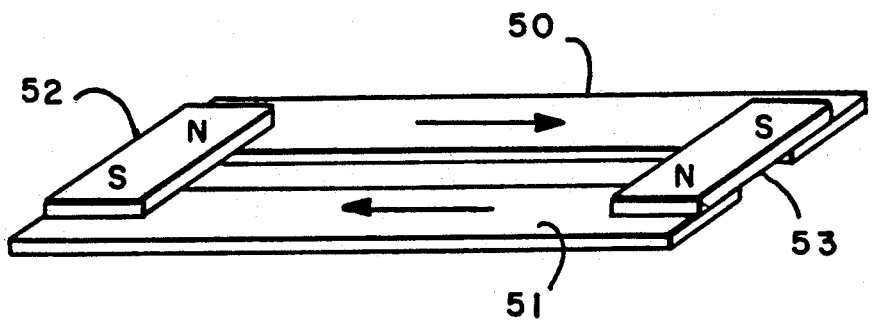
FIG. 4 is a simplified perspective view of a marker in accordance with another embodiment of the invention.

In the embodiment of the invention illustrated in FIG. 4, the marker is comprised of two parallel ferromagnetic strips 50,51. Separate magnet strips 52,53 bridge opposite ends of the strips, so that the strips are biased in opposite directions. Thus, the two differently biased regions, in accordance with the invention, may be formed in different bodies of the ferromagnetic material.

Figure 5:
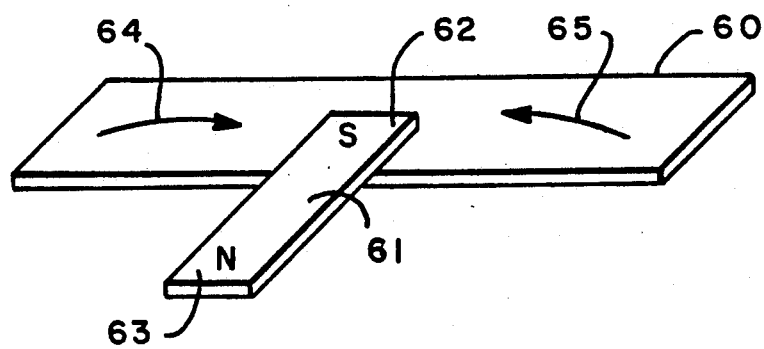
FIG. 5 is a simplified perspective view of a marker in accordance with still another embodiment of the invention.

In a still further embodiment of the invention, as illustrated in FIG. 5, a single strip 60 of magnetic material is provided. In this case, a single magnet 61 is also employed. The magnet is position to extend generally perpendicular to the strip 60, with one end 62 of the magnet generally adjacent the longitudinal center of the strip. Since the other end 63 of the magnet is spaced a further distance from the strip, the field of the magnet produces oppositely directed fields in the two ends of the strip, as illustrated by the arrows 64,65.

Figure 6:
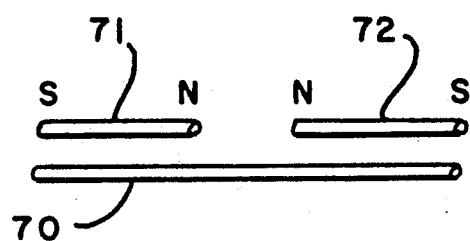
FIG. 6 is a simplified perspective view of a marker in accordance with a further embodiment of the invention.

It is of course apparent that the ferromagnetic material and magnets may have other shapes. For example, as illustrated in FIG. 6, the ferromagnetic material may be formed as a fiber 70, with the magnets 71,72 also being fiber shaped and extending parallel to the fiber 70. This embodiment of the invention is hence similar to the embodiment of FIG. 2. This embodiment is useful for applying the marker to textiles, since the fibers 70-72 may be woven directly into a textile article to be protected.

While the invention has been disclosed and described with reference to a single embodiment, it will be apparent that variations and modification may be made therein, and it is therefore intended in the following claims to cover each such variation and modifications as falls within the true spirit and scope of the invention.

What is claimed is:

1. In a marker for an electronic surveillance system, employing an alternating magnetic surveillance field including a strip of high permeability ferromagnetic material and means for applying a magnetic bias to said strip, the improvement wherein said strip has first and second regions spaced in the longitudinal direction thereof, said biasing means comprising first and second magnets for applying magnetic biases that are directed in first and second different directions in said first and second regions, and first and second magnets extending parallel to said strip adjacent said first and second regions, respectively, and being oppositely magnetized with respect to the longitudinal direction of said strip, whereby the marker produces a double pulse near each zero crossing of the surveillance field.

2. The market of claim 1 wherein said first and second magnets are strip-shaped and are longitudinally spaced apart.

3. The marker of claim 1 wherein said means for biasing comprises a magnet oriented substantially perpendicular to said strip, generally centrally longitudinally thereof, and having a first pole closer to said strip than the other pole thereof.

4. The marker of claim 1 wherein said material comprises first and second parallel strips of ferromagnetic material, said first and second regions being located in said first and second strips, respectively.

5. The marker of claim 4 wherein said first and second strips are transversely spaced apart, and said biasing means comprises a first magnet extending between the first and second strips at a first adjacent position thereof, and a second magnet extending between the first and second strips at a second adjacent position thereof, said second magnet being poled opposite to said first magnet, with respect to said first and second strips.

6. A marker for an electronic surveillance system employing an alternating magnetic surveillance field comprising first and second bodies of ferromagnetic material, and means for magnetically biasing said bodies in different respective directions, whereby the marker produces a double pulse near each zero crossing of the surveillance field.

7. The marker of claim 6 wherein said biasing means comprises means for biasing said first and second bodies in opposite respective directions.

8. The marker of claim 7 wherein said ferromagnetic material is fiber shaped.

9. In an electronic surveillance system including a magnetic field generator for producing an alternating magnetic surveillance field, a magnetic field detector and a marker adapted to pass in the field of said generator to influence the signals detected by said detector, the improvement wherein said marker comprises a high permeability ferromagnetic material and means for applying a magnetic bias to said ferromagnetic material, said material having first and second regions, and said biasing means comprising means for applying magnetic biases that are directed in first and second different directions in said first and second regions, whereby the marker produces a double pulse near each zero crossing of the surveillance field.

* * * * *